US 8,780,264 B2

(12) United States Patent
Inata et al.

(10) Patent No.: US 8,780,264 B2
(45) Date of Patent: Jul. 15, 2014

(54) CAMERA DRIVE DEVICE

(75) Inventors: Masahiro Inata, Hyogo (JP); Teruyuki Takizawa, Osaka (JP); Kozo Ezawa, Osaka (JP); Yoshiaki Sugitani, Nara (JP); Masayuki Misaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 13/498,940

(22) PCT Filed: Jul. 6, 2011

(86) PCT No.: PCT/JP2011/003878
§ 371 (c)(1),
(2), (4) Date: Mar. 29, 2012

(87) PCT Pub. No.: WO2012/004994
PCT Pub. Date: Jan. 12, 2012

(65) Prior Publication Data
US 2012/0182472 A1 Jul. 19, 2012

(30) Foreign Application Priority Data

Jul. 7, 2010 (JP) .................. 2010-154521

(51) Int. Cl.
*H04N 5/225* (2006.01)
(52) U.S. Cl.
USPC ........................................... 348/374; 396/55
(58) Field of Classification Search
CPC . H04N 5/2253; H04N 5/2254; H04N 5/2251; H04N 5/23248; H04N 5/23287; G03B 5/00; G03B 2205/0007; G02B 27/646
USPC ........................................... 348/374; 396/55
See application file for complete search history.

(56) References Cited

U.S. PATENT DOCUMENTS

| 5,956,529 | A | 9/1999 | Lee et al. | |
| 8,027,579 | B2* | 9/2011 | Takizawa et al. | 396/55 |
| 8,059,951 | B2* | 11/2011 | Miyamori et al. | 396/55 |

(Continued)

FOREIGN PATENT DOCUMENTS

| JP | 11-220651 A | 8/1999 |
| JP | 2002-344784 A | 11/2002 |

(Continued)

OTHER PUBLICATIONS

International Search Report for corresponding International Application No. PCT/JP2011/003878 mailed Aug. 2, 2011.

(Continued)

*Primary Examiner* — Twyler Haskins
*Assistant Examiner* — Fayez Bhuiyan
(74) *Attorney, Agent, or Firm* — Renner, Otto, Boisselle & Sklar, LLP

(57) ABSTRACT

A camera driving apparatus according to the present invention includes a camera section 100; a fixed unit including a protrusion section 202 at least partially formed of a magnetic member and has a shape of at least a part of a spherical face; a movable unit, the movable unit including an attracting magnet 404 for generating a magnetic attracting force, and a conical contact face with which the protrusion section of the fixed unit is loosely engageable and contactable by the magnetic attracting force, the movable unit being freely pivotable with respect to a sphere center of the spherical face of the protrusion section; a panning driving section; a tilting driving section; a rolling driving section; a detector; and a line 310' spirally wound around the protrusion section 202 for connecting the camera section and an external circuit provided on the fixed unit to each other.

9 Claims, 13 Drawing Sheets

(56) References Cited

U.S. PATENT DOCUMENTS

| | | |
|---|---|---|
| 2006/0033818 A1 | 2/2006 | Wada et al. |
| 2010/0195206 A1* | 8/2010 | Miyamori et al. ............ 359/557 |
| 2010/0202766 A1* | 8/2010 | Takizawa et al. ............... 396/55 |
| 2011/0122495 A1* | 5/2011 | Togashi ......................... 359/557 |

FOREIGN PATENT DOCUMENTS

| | | |
|---|---|---|
| JP | 2005-311758 A | 11/2005 |
| JP | 2006-053358 A | 2/2006 |
| JP | 2008-058391 A | 3/2008 |
| WO | 2010/010712 A1 | 1/2010 |

OTHER PUBLICATIONS

Form PCT/ISA/237 for corresponding International Application No. PCT/JP2011/003878 mailed Aug. 2, 2011 and Partial English translation.

Co-pending U.S. Appl. No. 13/392,150, filed Feb. 24, 2012 (application provided).

\* cited by examiner

CAMERA DRIVE DEVICE

TECHNICAL FIELD

The present invention relates to a camera driving apparatus capable of inclining a camera section including an imaging element in a panning (yawing) direction and a tilting (pitching) direction and also capable of rotating (rolling) the camera section around an optical axis of the lens.

BACKGROUND ART

Many of video cameras and digital cameras recently on the market include a camera-shake compensation device for compensating for image blurring of a photo caused by camera-shake. The camera-shake compensation device inclines a lens, a lens barrel, a reflective mirror, an imaging element or the like with respect to an optical axis of the camera, or moves such an element on a plane perpendicular to the optical axis two-dimensionally.

For example, Patent Document 1 discloses a shake compensation mechanism having a structure which elastically supports the lens barrel at one point and inclines the lens barrel with respect to the optical axis. Patent Document 2 discloses a camera-shake compensation device which supports the mirror with a pivot structure and inclines the mirror with respect to the optical axis. Patent Document 3 discloses an imaging lens unit which supports a spherical lens barrel at three points and inclines the lens barrel while moving the lens barrel along the optical axis.

CITATION LIST

Patent Literature

Patent Document 1: Japanese Laid-Open Patent Publication No. 2006-53358
Patent Document 2: Japanese Laid-Open Patent Publication No. 11-220651
Patent Document 3: Japanese Laid-Open Patent Publication No. 2008-58391

SUMMARY OF INVENTION

Technical Problem

It is generally considered that the camera-shake angle caused when a person takes an image while being still is about ±0.3 degrees and that the generated frequency component is about 20 to 30 Hz. It is also considered that the camera-shake compensation needs to be controlled in a frequency band of about 10 Hz.

As is understood, when a photographer takes an image using a video camera or a digital camera while being still, the camera-shake angle is relatively small and the frequency for the control is relatively low. Owing to this, a conventional camera driving apparatus for compensating for image blurring of a photo caused by the camera-shake occurring while the photographer is in a still state realizes good camera-shake compensation, despite that the angle at which each of sections of the camera driving apparatus (lens, lens barrel, reflective mirror, imaging element, etc.) is to be inclined with respect to the optical axis of the lens or the amount by which such an element is to be moved straight on a plane perpendicular to the optical axis two-dimensionally is very small.

However, when the photographer takes a moving picture or a still picture while walking, the angle of a shake of an image (hereinafter, occasionally referred to as "walk-shake"; walk-shake encompasses camera-shake) is, for example, ±10 degrees or greater. It is considered that the walk-shake compensation needs to be controlled in a frequency band of about 50 Hz.

When the angle of the shake of the image is larger and the compensation needs to be controlled at a higher frequency, the conventional camera driving apparatus has a problem in the structure of a support system for supporting the elements and a driving system for driving the elements.

For example, the device in Patent Document 1 is suitable for inclining the lens barrel at a very small angle. However, for inclining the lens barrel at a large angle exceeding ±10 degrees, an elastic body which supports the device is considered to be deformed to the level of plasticity. When the angle at which the lens barrel is inclined becomes large, the load caused by the spring constant of the elastic body becomes excessively large, and the amplitude increase coefficient (Q factor) of inherent vibration by the elastic body is also increased. It is considered that as a result, the phase characteristic and the gain characteristic of the compensation control are declined, and so it becomes difficult to control the compensation in the above-described frequency band.

The device in Patent Document 2 drives the reflective mirror in order to compensate for the shake of the image. However, where a video camera or a digital camera includes a wide-angle lens system, a reflective mirror provided in the optical system cannot avoid becoming large. Therefore, the reflective mirror cannot be considered to be a solution suitable for a video camera or a digital camera, which is desired to be compact. In addition, the mirror is supported with a pivot structure using a magnetic attracting force, and so the mirror may fall due to an external disturbance such as vibration, impact or the like.

The lens unit in Patent Document 3 includes a spherical lens holder, and so can incline the lens holder at a large angle. However, the rotating radius of a part along which the lens holder contacts a holder provided outer to the lens holder is large. Therefore, the frictional load on a movable section is large, and so the moving distance by motion is long. For this reason, it is considered that when the inclining angle becomes large, the contact frictional load changes much, which makes it difficult to provide accurate control. Unless the gap between the lens holder and the holder provided outer thereto is controlled accurately, it is difficult to accurately control the inclining angle of the lens holder. Depending on the processing precision of these components, a mechanical looseness may occur, which may hinder the frequency response characteristic of the movable section.

None of the devices in Patent Documents 1 through 3 has a structure for rotating the element such as a lens or the like around the optical axis of a camera section.

When the number of the rotation directions or the number of the driving directions of the camera section is increased, or when the rotating angle is increased, the distance between the camera section mounted on the movable section and a power supply or an image processing circuit provided on a fixed section is significantly changed, or the direction of the camera section as seen from the power supply or the image processing circuit is significantly changed. Therefore, when the camera section is electrically connected to the power supply or the image processing circuit by a line, a stress on the line may prevent a rotating motion of the movable section, or the line may receive a stress repeatedly by a repeated rotation of the movable section, resulting in breakage of the line.

In the case where the line is provided with sufficient flexion so that the line is not receive a large stress, a space for allowing the line to be bent is required. This enlarges the space for the line, which increases the size of the apparatus.

The present invention has an object of solving at least one of these problems of the conventional art and realizing a camera driving apparatus capable of rotating a camera section in three axial directions.

Solution to Problem

A camera driving apparatus according to the present invention includes a camera section including an imaging element having an imaging plane, a lens which has an optical axis and forms an image of a subject on the imaging plane, and a lens barrel for holding the lens; a fixed unit including a protrusion section which is formed of a magnetic member at least partially and has a shape of a part of a spherical face; a movable unit for supporting the camera section, the movable unit including an attracting magnet for generating a magnetic attracting force for the magnetic member, and a conical contact face with which the protrusion section is loosely engageable and contactable by the magnetic attracting force, the movable unit being freely pivotable with respect to a sphere center of the spherical face of the protrusion section; a panning driving section for inclining the camera section with respect to the fixed unit in a panning direction; a tilting driving section for inclining the camera section with respect to the fixed unit in a tilting direction which is perpendicular to the panning direction; a rolling driving section for rotating the camera section with respect to the fixed unit in a rolling direction centered around the optical axis of the lens; a detector for detecting an inclining angle of the camera section with respect to the fixed unit in the panning and tilting directions and a rotating angle of the camera section in the rolling direction; and a line for connecting the camera section and an external circuit to each other, the line being spirally wound around the protrusion section.

In a preferable embodiment, the line includes at least two flexible printed wiring plates, and the at least two flexible printed wiring plates have an axial symmetrical structure with respect to the optical axis obtained when the movable unit is at a neutral position.

In a preferable embodiment, the detector includes a first detection section for detecting an inclining angle of the camera section with respect to the fixed unit in the panning and tilting directions; and a second detection section for detecting a rotating angle of the camera section in the rolling direction.

In a preferable embodiment, the first detection section includes a first magnetic sensor fixed to the fixed unit; and the first magnetic sensor detects a change of a magnetic force caused by inclination of the attracting magnet provided in the movable unit to calculate a two-dimensional inclining angle of the camera section in the panning and tilting directions.

In a preferable embodiment, the second detection section includes a pair of rotation detection magnets fixed to the fixed unit; and a pair of second magnetic sensors respectively attached to the at least two flexible printed wiring plates. The pair of second magnetic sensors detect a change of a magnetic force caused by a mutual rotating motion of the rotation detection magnets to calculate a rotating angle of the camera section.

In a preferable embodiment, the pair of second magnetic sensors are located symmetrically with respect to the sphere center on a straight line which is on a plane perpendicular to the optical axis of the lens and passes the sphere center, and the pair of rotation detection magnets are located symmetrically with respect to the sphere center on a straight line which is on a plane perpendicular to the optical axis of the lens and passes the sphere center.

In a preferable embodiment, the pair of rotation detection magnets each include two magnetic poles, magnetized oppositely to each other, on a straight line which is on a plane perpendicular to the optical axis of the lens and passes the sphere center, and the two magnetic poles are arranged on a circumference of a circle centered around the optical axis.

In a preferable embodiment, the line has a rounded shape or a bent shape in the vicinity of an end thereof connected to the camera section.

In a preferable embodiment, the camera driving apparatus of further includes a fall preventive member including a fall preventive regulation section distanced from the movable unit by a prescribed gap in a direction of the optical axis, the fall preventive member being fixed to the fixed unit.

Advantageous Effects of Invention

In a camera driving apparatus according to the present invention, a pivot supporting structure is formed of a contact face provided on the movable unit and defining a conical shape and a protrusion section formed of a magnetic member at least partially and having a shape of at least a part of a spherical face. Therefore, the movable unit can be freely rotated around a sphere center of the spherical face with respect to the fixed unit. The protrusion section is kept in a state of contacting the contact face by a magnetic attracting force of the attracting magnet, and therefore the load on the pivot support can be kept constant regardless of the rotation state of the movable unit. Even if the movable unit receives an external impact, the fall preventive regulation sections prevent the movable unit from falling and allows the movable unit to return to a state where the protrusion section is in contact with the contact face.

The line for connecting the camera section provided on the movable unit and a circuit section provided on the fixed unit to each other are spirally wound around the protrusion section. Owing to this, the line can be provided with a space-saving structure and can have much flexion with certainty. This structure can realize a smooth rotating motion of the movable unit without preventing the motion of the movable unit of freely pivoting in the three axial directions. In addition, since the wiring member can drawn with a space-saving structure, the camera driving apparatus can be reduced in size.

The line includes a pair of flexible printed wiring plates, which have an axial symmetrical structure with respect to the optical axis 10. Owing to this, in whichever direction the movable unit may be inclined as seen from the optical axis 10 in the neutral state as a result of rotating in the panning direction and the tilting direction, elastic forces generated in the pair of flexible printed wiring plates act, with approximately an equal force, on the movable unit so as to return the movable unit to the neutral position. As a result, the movable unit can be kept at the neutral position. Therefore, it is not necessary to cause an extra offset current to constantly flow in order to keep the movable unit at the neutral position, and thus the power consumption can be reduced.

The magnetic sensors for detecting the rotating angle in the rolling direction are provided symmetrically on the pair of flexible printed wiring plates. Owing to this, a crosstalk output generated when the movable unit is pivoted in the panning direction and the tilting direction can be canceled by detection of rotation performed by use of a change of the magnetic force. Therefore, only the angle in the rolling direction can be extracted and detected in the range in which the movable unit can be pivotable. In addition, means for detecting an angle in the rolling direction is provided on a circumference of a circle having a small radius centered around the optical axis so as to reduce the rotating distance to be detected. Owing to this, the apparatus can be space-saving.

Therefore, the present invention realizes a compact and durable camera driving apparatus which can incline the camera section in the panning direction and the tilting direction at an angle larger than in a conventional apparatus, also rotate the camera section in the rolling direction, realize good shake compensation control in a wide frequency band, and compensate for image blurring of a photo caused by walk-shake.

DESCRIPTION OF EMBODIMENTS

Figure 1:
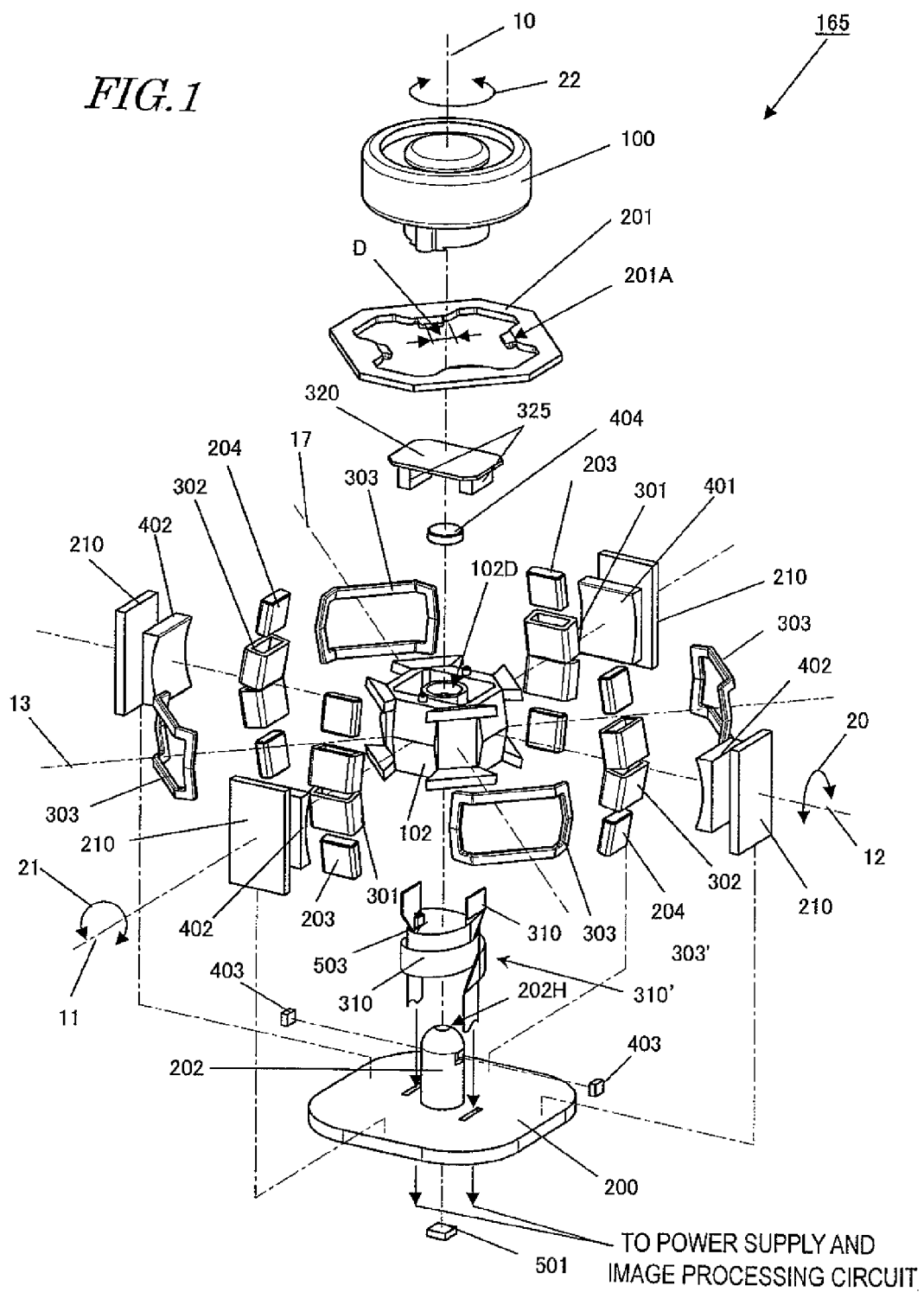
FIG. 1 is an exploded isometric view of a camera driving apparatus in an embodiment according to the present invention.
Figure 2:
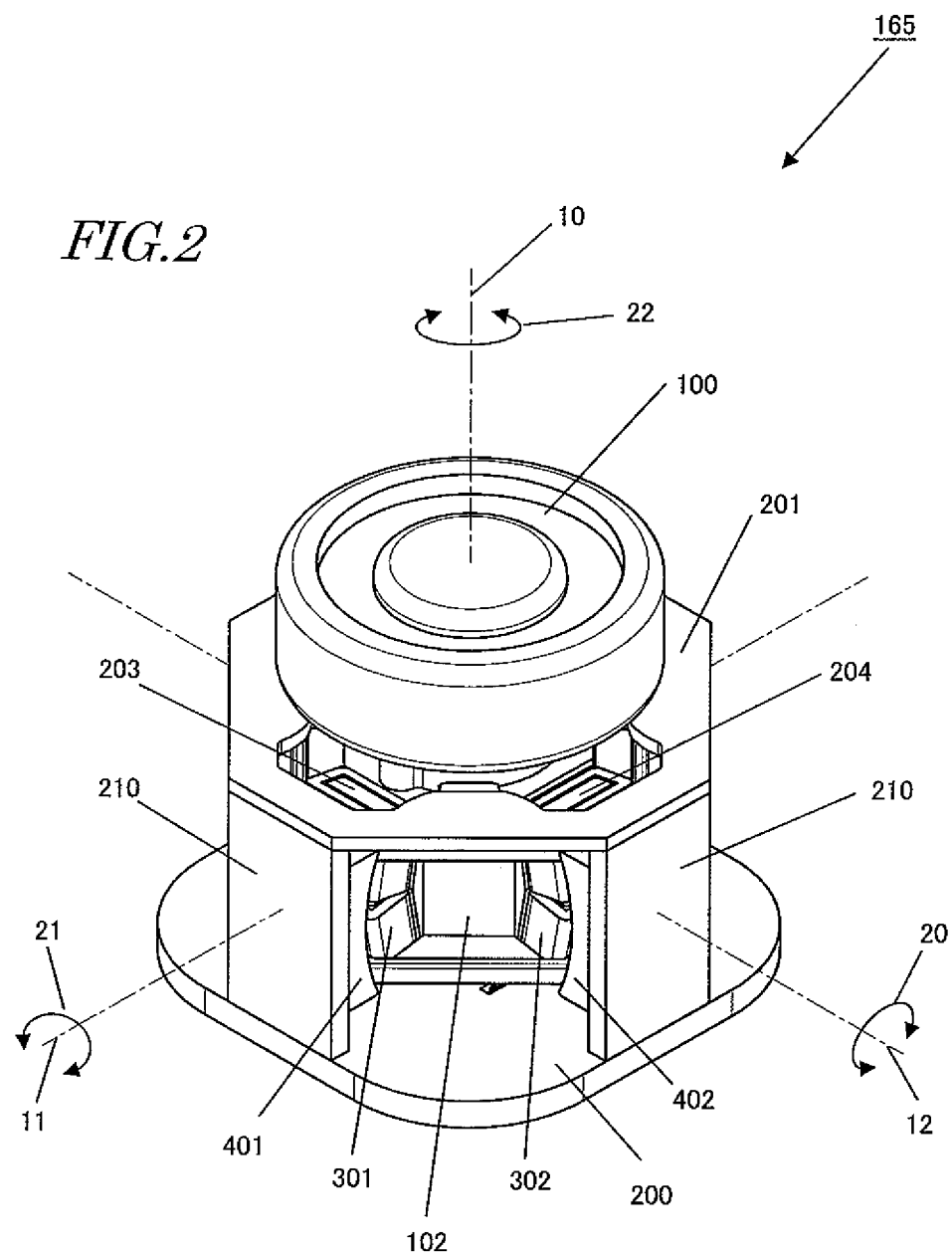
FIG. 2 is an isometric view of the camera driving apparatus in the embodiment as seen from above.

Hereinafter, a camera driving apparatus in an embodiment according to the present invention will be described. FIG. 1 is an exploded isometric view of a camera driving apparatus 165 in an embodiment according to the present invention. FIG. 2 is an isometric view of the camera driving apparatus 165 as seen from above obliquely.

Figure 3:
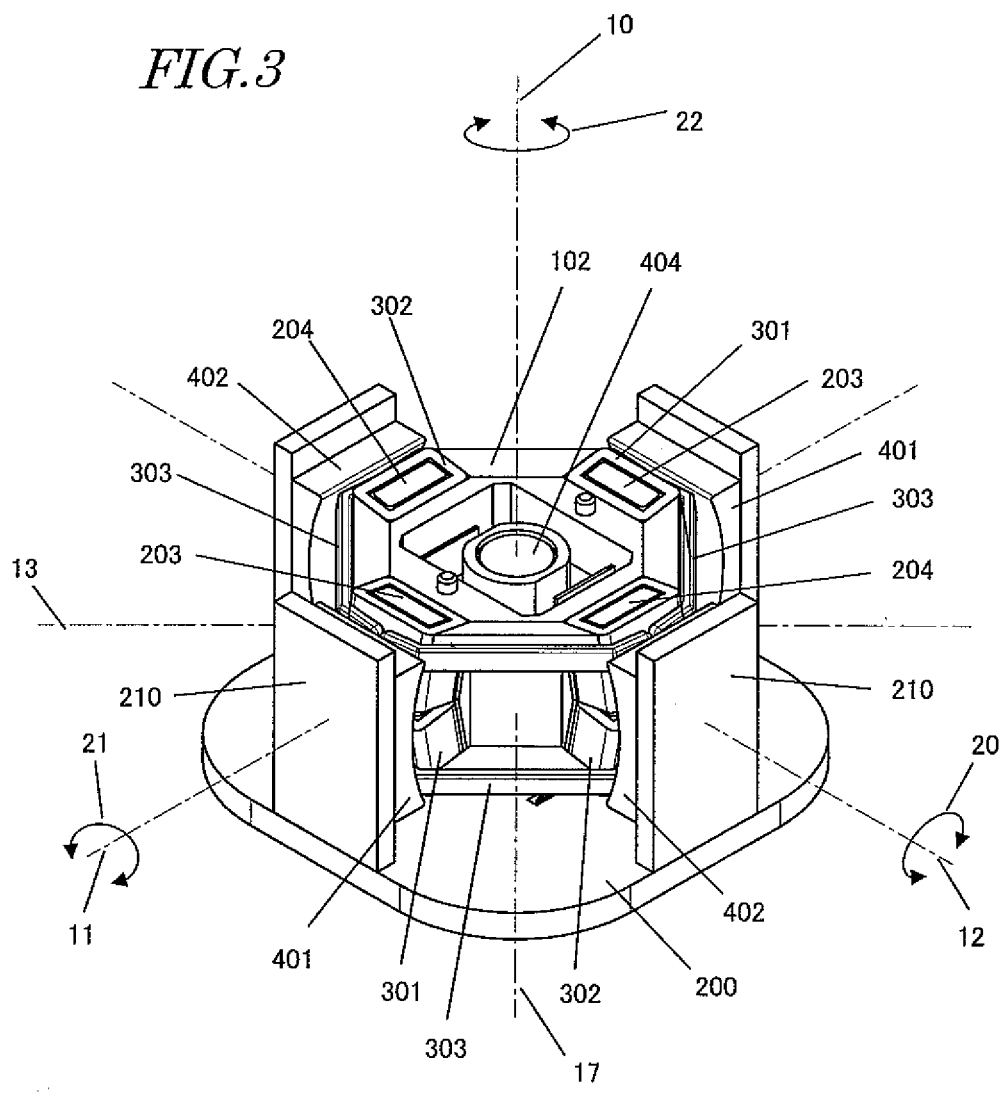
FIG. 3 is an isometric view of the camera driving apparatus in the embodiment as seen from above in the state where a camera section 100 and a fall preventive member 201 have been removed.
Figure 4:
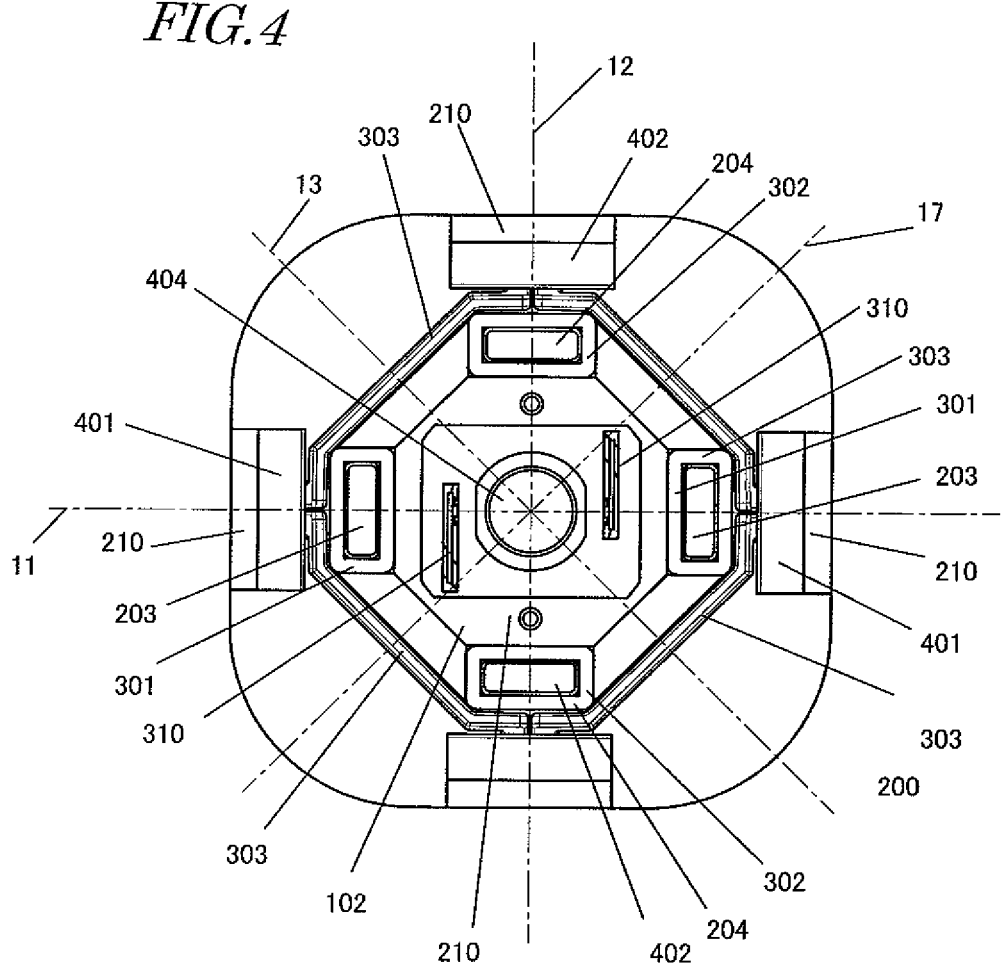
FIG. 4 is a plan view of the camera driving apparatus in the embodiment as seen from above in the state where the camera section 100 and the fall preventive member 201 have been removed.

FIG. 3 is an isometric view of the camera driving apparatus 165 as seen from above obliquely in the state where a part of components thereof (camera section 100 and fall preventive member 201) has been removed. FIG. 4 is a plan view of the camera driving apparatus 165 in the state of FIG. 3 as seen from above.

Figure 5:
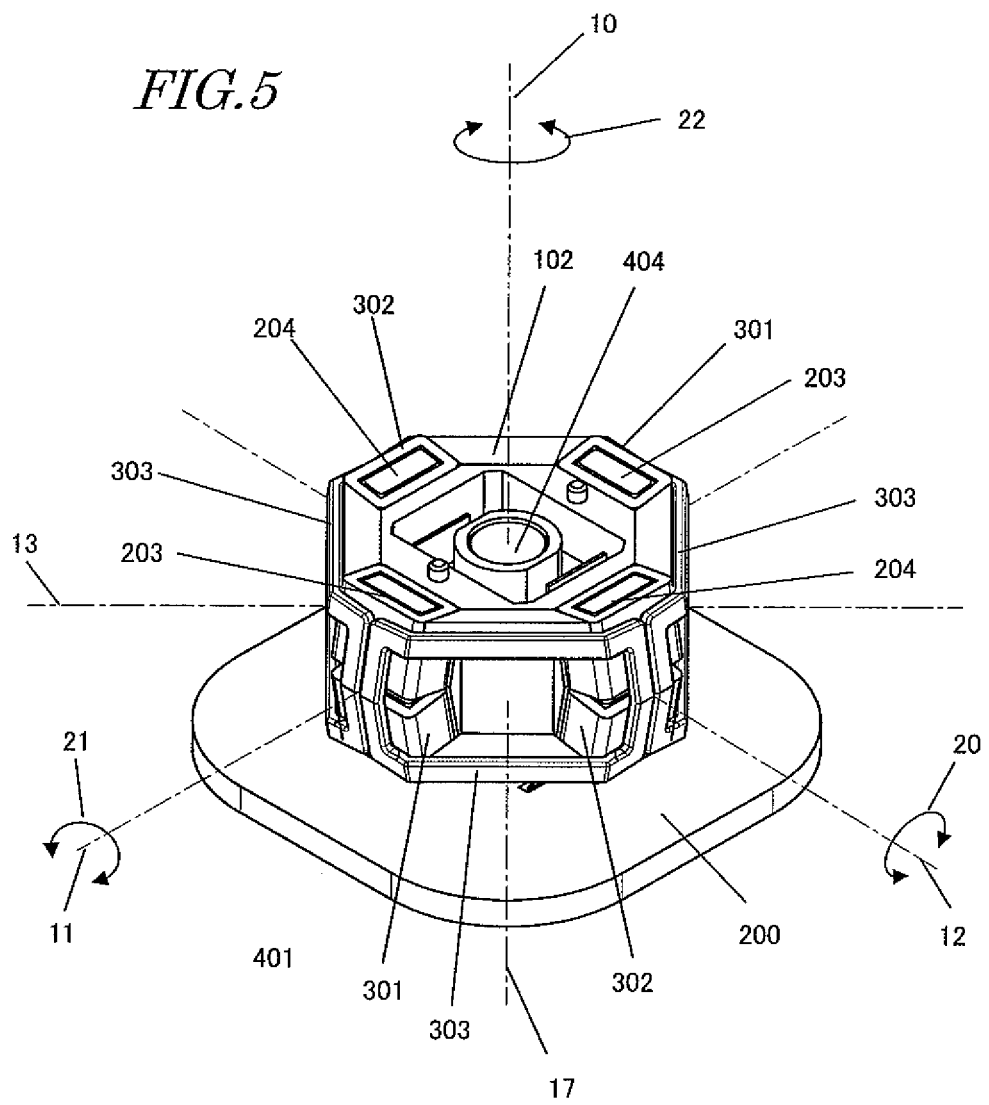
FIG. 5 is an isometric view of a movable unit without the camera section 100 in the camera driving apparatus in the embodiment.
Figure 6:
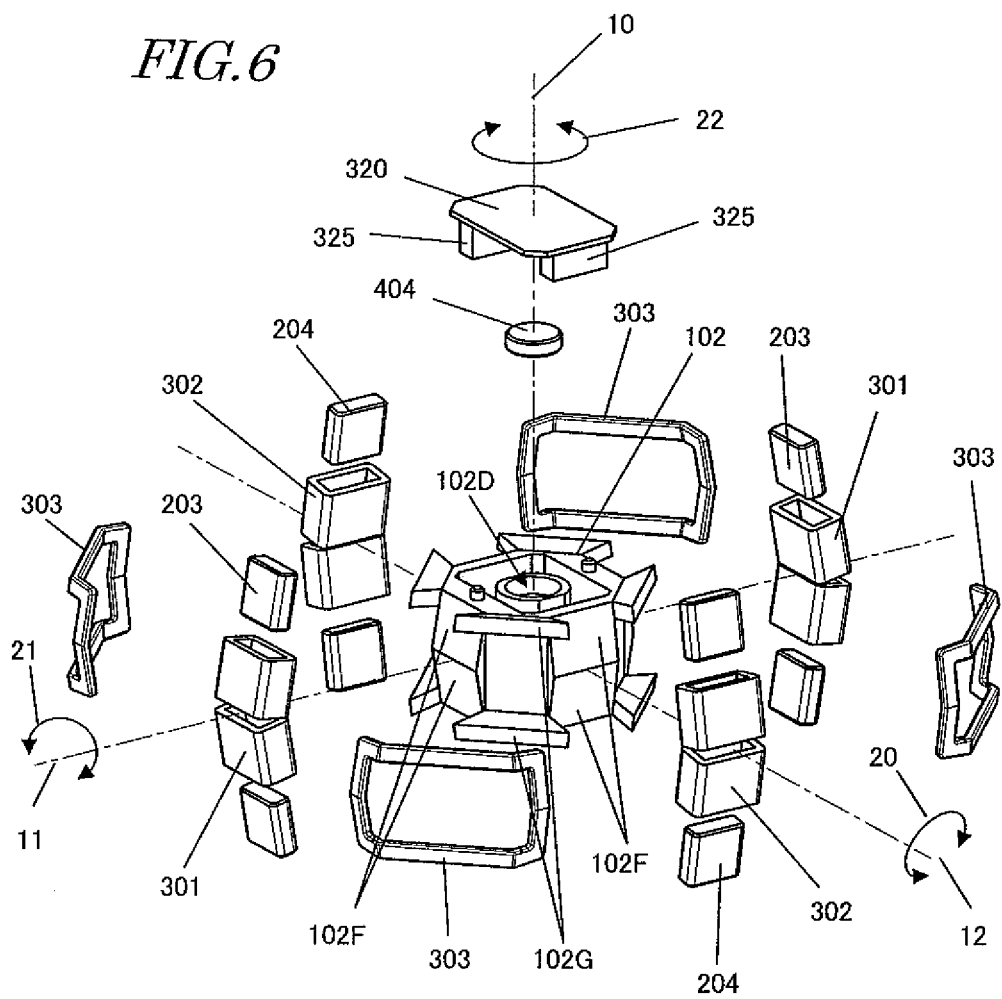
FIG. 6 is an exploded isometric view of the movable unit without the camera section 100 in the camera driving apparatus in the embodiment.

FIG. 5 is an isometric view of a movable unit without the camera section 100 as seen from above obliquely. FIG. 6 is an exploded isometric view schematically showing a structure of the movable unit without the camera section 100.

Figure 7:
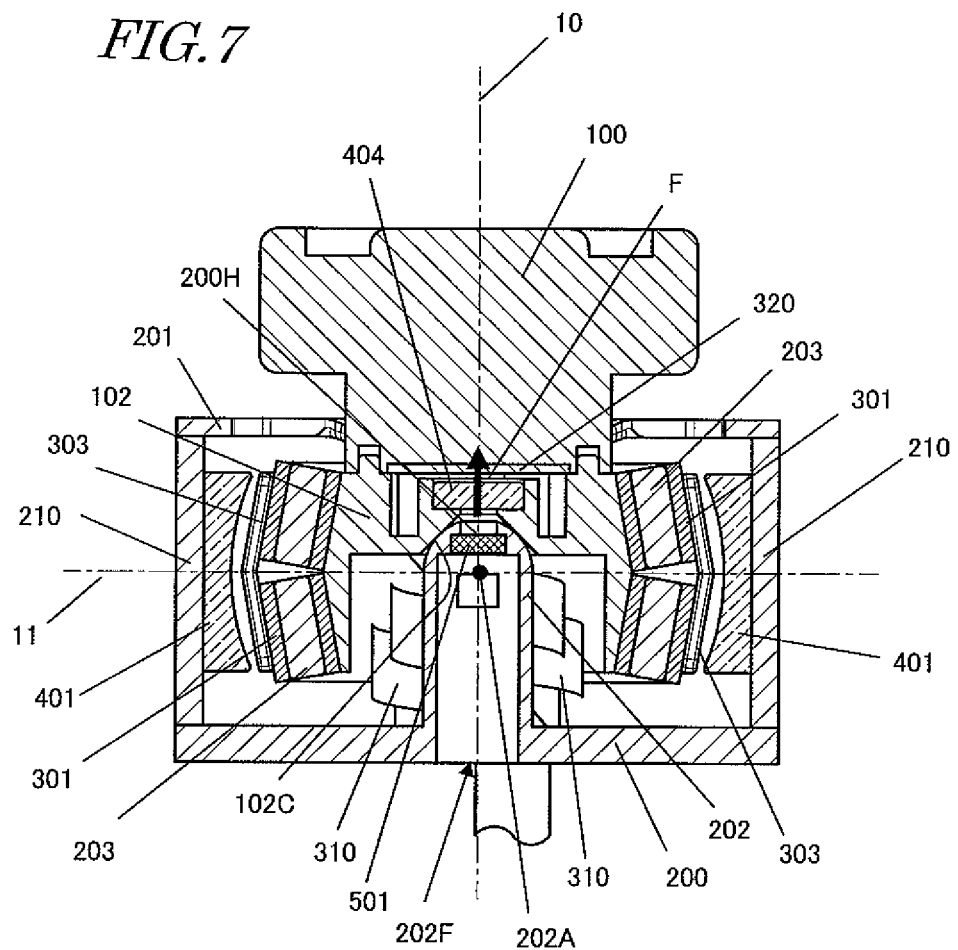
FIG. 7 is a cross-sectional view of the camera driving apparatus in the embodiment taken along a plane including an optical axis 10 and a tilting direction rotation axis 11.
Figure 8:
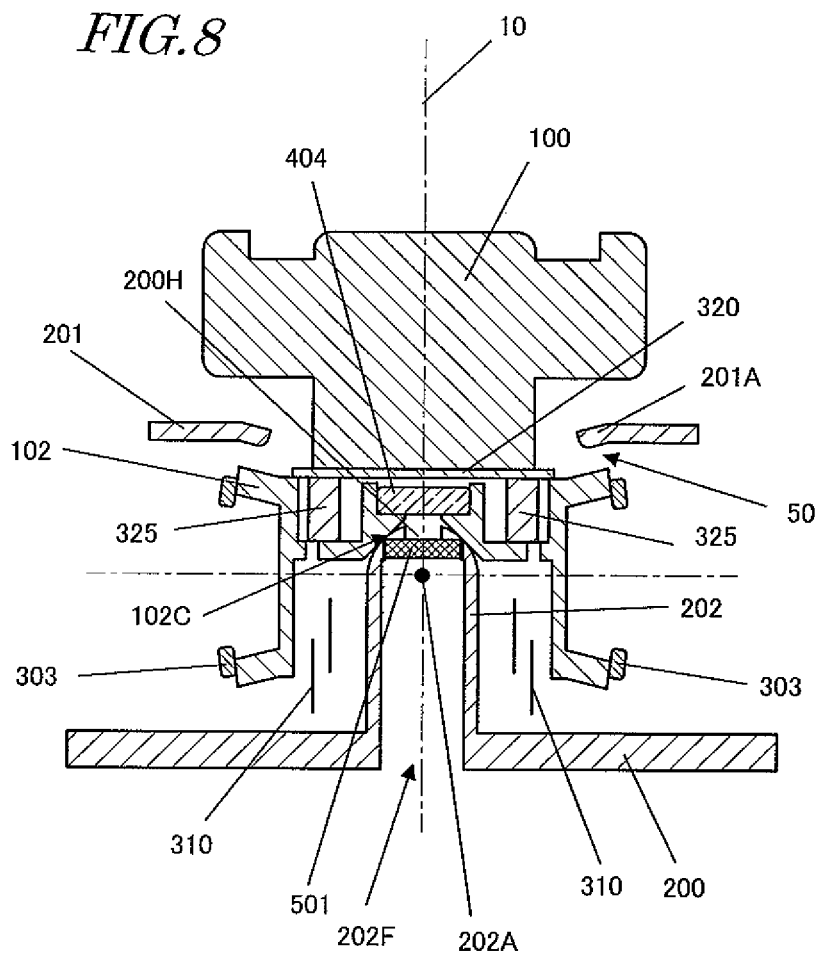
FIG. 8 is a partial cross-sectional view of the camera driving apparatus in the embodiment taken along a plane including the optical axis 10 and a straight line 17.

FIG. 7 is a partial cross-sectional view of the camera driving apparatus 165 taken along a plane including an optical axis 10 and a tilting direction rotation axis 11. FIG. 8 is a partial cross-sectional view of the camera driving apparatus 165 taken along a plane including the optical axis 10 and a straight line 17 (having an angle of 45 degrees with respect to the tilting direction rotation axis 11).

Figure 9:
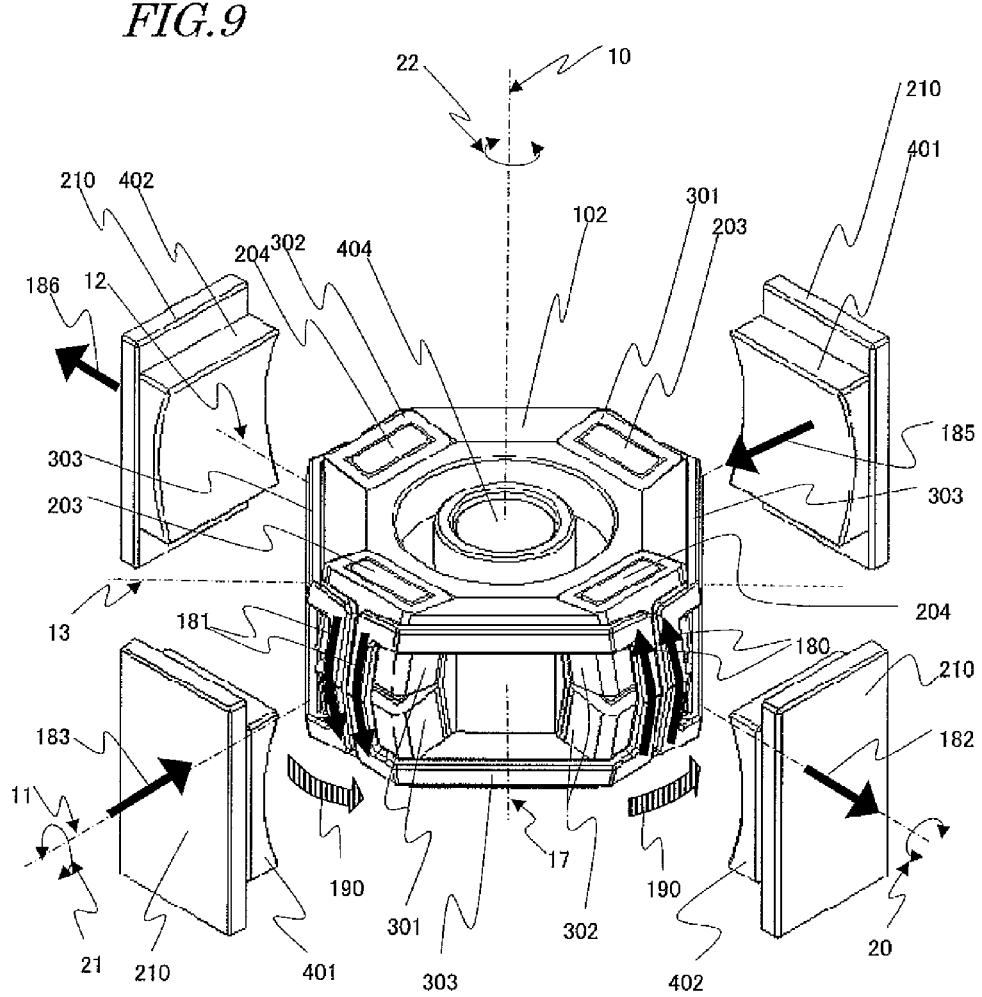
FIG. 9 is an exploded isometric view of the camera driving apparatus in the embodiment as seen from above in the state where the camera section 100 and the fall preventive member 201 have been removed, which shows a driving principle in a rolling direction.

FIG. 9 is an exploded isometric view of the camera driving apparatus 165 in the state where the camera section 100 and the fall preventive member 201 have been removed, which shows a driving principle in a rolling direction.

With reference to there figures, a main structure of the camera driving apparatus 165 will be described.

The camera driving apparatus 165 includes the camera section 100, a movable unit for supporting the camera section 100, a fixed unit, and a line 310'. With respect to the fixed unit, the movable unit is freely rotatable in the rolling direction 22 around the optical axis 10 of a lens as the center of rotation, in a tilting direction 21 around the tilting direction rotation axis 11 as the center of rotation, and in a panning direction 20 around a panning direction rotation axis 12 as the center of rotation.

As shown in FIG. 1, the camera section 100 takes an image of a subject and generates an electrical signal representing the subject. More specifically, the camera section 100 includes an imaging element (not shown), the lens (not shown) having the optical axis 10 for forming an image of the subject on an imaging plane of the imaging element, and a lens barrel (not shown) for holding the lens; and converts the image formed on the imaging plane of the imaging element into an electrical signal.

The fixed unit includes a base 200 and a protrusion section 202. As shown in FIG. 7, the protrusion section 202 has a shape forming at least a part of a spherical face having a sphere center 202A, which is on the optical axis 10. Hereinafter, a portion having a shape forming at least a part of the spherical face will be referred to as the "partial spherical face".

As shown in FIG. 1 and FIG. 7, the protrusion section 202 is fixed to the base 200. At least a part of the protrusion section 202 is formed of a magnetic member. The protrusion section 202 has a cylindrical structure having an opening 202F on the base 200 side. The protrusion section 202 also has a tip opening 202H in a tip portion thereof on the optical axis 10. The tip portion of the protrusion section 202 accommodates therein a first magnetic sensor 501, inserted from the opening 202F, on the optical axis 10. A top portion of the first magnetic sensor 501 is exposed to the tip opening 202H.

A movable section 102 forming a central part of the movable unit includes an attracting magnet 404 fixed to a fixed face 102D and a contact face 102C. The contact face 102C is an inner face defining a conical shape and is located on the movable section 102 such that a tip thereof is located on a top side. The attracting magnet 404 is located in the vicinity of the tip of the conical shape and is located in a top portion of the movable section 102. Preferably, the movable section 102 is formed of a non-magnetic material such as a resin material or the like.

As shown in FIG. 7, the protrusion section 202 of the fixed unit is inserted into a space defined by the conical contact face 102C of the movable section 102. The protrusion section 202 is partially formed of a magnetic member and so contacts the contact face 102C by a magnetic attracting force F of the attracting magnet 404 provided above the protrusion section 202 and thus is loosely engaged with the contact face 102C. Preferably, the center of gravity of the movable unit for supporting the camera section 100 matches the sphere center 202A in the state where the movable unit is supported by the protrusion section 202 of the fixed unit.

Owing to this, the movable section 102 is freely rotatable with respect to the sphere center 202A of the spherical face while the conical contact face 102C and the partial spherical face of the protrusion section 202 are in contact with each other.

More specifically, as shown in FIG. 1, the movable section 102 can rotate in two inclining directions, i.e., the panning direction 20 and the tilting direction 21, and also in the rolling direction 22. In the panning direction 20, the movable section 102 can rotate around the panning direction rotation axis 12, which is perpendicular to the optical axis 10 and passes the sphere center 202A. In the tilting direction 21, the movable section 102 can rotate around the tilting direction rotation axis 11, which is perpendicular to the optical axis 10 and the panning direction rotation axis 12. In the rolling direction 22, the movable section 102 can rotate around the optical axis 10 of the lens.

As described above, in this embodiment, the movable unit supporting the camera section 100 is supported by the fixed unit so as to be freely rotatable around the sphere center 202A, and the center of gravity of the movable unit for supporting the camera section 100 matches the sphere center 202A. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress the friction load from changing in accordance with the pivoting angle, and can realize a good phase characteristic and a good gain characteristic in the driving frequency band.

In the case where a surface portion of the protrusion section 202 is covered with a resin material (not shown), the friction between the conical contact face 102C and the protrusion section 202, which are in contact with each other, can be further reduced. This can realize a supporting structure having a high abrasion resistance.

It is preferable that the camera driving apparatus 165 includes a fall preventive structure for preventing the movable unit from falling from the fixed unit. Specifically, as shown in FIG. 1, FIG. 2 and FIG. 7, a ring-shaped fall preventive member 201 is fixed to the base 200 of the fixed unit via four coupling members 210. As shown in FIG. 1, the fall preventive member 201 includes four protrusion-like fall preventive regulation sections 201A extending toward the center of the ring, namely, toward the optical axis 10. The four fall preventive regulation sections 201A are provided in the form of two pairs.

As shown in FIG. 8, the fall preventive regulation sections 201A are each distanced from a part of the movable section 102 by a prescribed gap 50 in a direction of the optical axis 10.

The fall preventive regulation sections 201A contact the movable section 102 to prevent the movable unit from rotating at an angle exceeding a prescribed angle, or to prevent the movable unit from being detached from the fixed unit when the contact face 102C of the movable unit is separated from the protrusion section 202 by an external impact.

As shown in FIG. 1, among the four fall preventive regulation sections 201A, one pair of fall preventive regulation sections 201A are located on a straight line 13, and the other pair of fall preventive regulation sections 201A are located on a straight line 17. The straight lines 13 and 17 have an angle of 45 degrees with respect to the panning direction rotation axis 12 and the tilting direction rotation axis 11. Specifically, on each of the straight lines 13 and 17, a pair of fall preventive regulation sections 201A are located symmetrically with respect to the optical axis 10.

When the movable unit is inclined at an angle of θ in both of the panning direction 20 and the tilting direction 21, the rotating angles of the movable unit with respect to the straight line 13 and the straight line 17, which have an angle of 45 with respect to the panning direction rotation axis 12 and the tilting direction rotation axis 11, are each √2×θ or greater. Therefore, by providing the fall preventive regulation sections 201A for limiting the inclining angle in these directions, the pivoting of the movable unit is limited and the displacement of a part of the movable unit which is moved by a longest distance in the direction of the optical axis 10 by an external impact is limited. Thus, the movable unit can be prevented from falling with certainty.

By contrast, when the movable unit is inclined at an angle of θ in only one of the panning direction 20 and the tilting direction 21, the change of the height of the movable unit in the direction of the optical axis 10 caused by the inclination is largest in the other of the panning direction 20 and the tilting direction 21. The change of the height in the directions of the straight lines 13 and 17 is 1/√2 times the change of the height in the other of the panning direction 20 and the tilting direction 21. Therefore, by making a width D of each of the fall preventive regulation sections 201A large as shown in FIG. 1, the movable unit can be safely prevented from falling.

The gap 50 is set to have a length by which even if the contact face 102C is separated from the protrusion section 202, the contact face 102C can be returned to a state of contacting the protrusion section 202 by the magnetic attracting force F of the attracting magnet 404. Namely, even in the state where the movable unit is moved upward by a distance equal to the gap 50 and so the fall preventive regulation sections 201A contact the movable section 102, the movable unit can be returned to the original state where the contact face 102C is in contact with the protrusion section 202 by the magnetic attracting force F of the attracting magnet 404.

Owing to this, this embodiment can provide a camera driving apparatus having a high impact resistance, in which the movable unit, even if instantaneously falling from a prescribed position, can be immediately returned to the original well-supported state by the magnetic attracting force F of the attracting magnet 404.

Now, a structure for driving the movable unit will be described. The camera driving apparatus 165 includes a driving mechanism for driving the movable unit. The driving mechanism includes a panning driving section and a tilting driving section for inclining the movable unit, having the camera section 100 mounted thereon, in the panning direction and the tilting direction 21 with respect to the fixed unit, and a rolling driving section for rotating the camera section 100 in the rolling direction 22 around the optical axis 10 of the lens with respect to the fixed unit.

Specifically, the driving mechanism includes two pairs of driving magnets fixed to the base 200 via the coupling members 210 each formed of a magnetic member, magnetic yokes mounted on the movable unit, and driving coils wound around the magnetic yokes. More specifically, as shown in FIG. 1 and FIG. 6, the driving mechanism includes a pair of panning driving coils 301, located symmetrically with respect to the sphere center 202A on the tilting direction rotation axis 11, for driving and thus rotating the movable unit in the panning direction 20, a pair of tilting driving coils 302, located symmetrically with respect to the sphere center 202A on the panning direction rotation axis 12, for driving and thus rotating the movable unit in the tilting direction 21, and four rolling driving coils 303 for driving and thus rotating the movable unit around the optical axis 10. As shown in FIG. 1, FIG. 3 and FIG. 4, a pair of panning driving magnets 401 and a pair of tilting driving magnets 402 are provided on the base 200 along a circumference of a circle centered around the optical axis 10 via the coupling members 210 each formed of a magnetic material.

The pair of panning driving coils 301 and the pair of panning driving magnets 401 form a panning driving section. The pair of tilting driving coils 302 and the pair of tilting driving magnets 402 form a tilting driving section. The pair of panning driving magnets 401 and the pair of tilting driving magnets 402 also act as rolling driving magnets, and these driving magnets and the rolling driving coils 303 form a rolling driving section.

The pair of panning driving magnets 401 are magnetized oppositely to each other in the direction of the tilting direction rotation axis 11, namely, on a straight line which is on a plane perpendicular to the optical axis 10 and passes the sphere center 202A. Similarly, the pair of tilting driving magnets 402 are magnetized oppositely to each other in the direction of the panning direction rotation axis 12, namely, on a straight line which is on a plane perpendicular to the optical axis 10 and passes the sphere center 202A.

Preferably, each one of the panning driving magnets 401 and each one of the tilting driving magnets 402, which are adjacent to each other at an interval of 90 degrees on a circumference of a circle which is on a plane perpendicular to the optical axis 10 and is centered around a point at which the optical axis 10 crosses the plane, are magnetized oppositely to each other with respect to the sphere center. Such an arrangement of the magnetization directions can be realized by, for example, as shown in FIG. 9, magnetizing the pair of panning driving magnets 401 in inward directions 183 and 185 toward the sphere center and magnetizing the pair of tilting driving magnets 402 in outward directions 182 and 186 away from the sphere center.

As described above, the panning driving magnets 401 and the tilting driving magnets 402 are magnetized to have magnetic fluxes in the direction of the tilting direction rotation axis 11 and the direction of the panning direction rotation axis 12, respectively. As shown in FIG. 1, FIG. 3 and FIG. 7, each of the panning driving magnets 401 and each of the tilting driving magnets 402 have a recessed curved face centered around the sphere center 202A.

The panning driving coils 301 are symmetrical with respect to a plane which is perpendicular to the optical axis 10 of the lens and includes the sphere center 202A. The tilting driving coils 302 are symmetrical with respect to a plane which is perpendicular to the optical axis 10 of the lens and includes the sphere center 202A. The panning driving coils 301 and the tilting driving coils 302 each have a generally V-shaped cross-section along a plane including the optical axis 10 of the lens, and are each located such that the trough portion of the V-shaped cross-section faces the optical axis 10.

As shown in FIG. 6, the pair of panning driving coils 301 and the pair of tilting driving coils 302 are fixed to contact faces 102F provided on the movable section 102. By contrast, the four rolling driving coils 303 are fixed to contact faces 102G, and also are each bonded and thus fixed to one of the panning driving coils 301 facing the panning driving magnets 401 and one of the tilting driving coils 302 facing the tilting driving magnets 402, so as to bridge a side face of the one of the panning driving coils 301 and a side face of the one of the tilting driving coils 302. A part of each rolling driving coil 303 overlaps a part of the corresponding panning driving coil 301 and a part of the corresponding tilting driving coil 302. The part of each rolling driving coil 303 overlapping the part of the panning driving coil 301 and the part of each rolling driving coil 303 overlapping the part of the tilting driving coil 302 are symmetrical with respect to a plane which is perpendicular to the optical axis 10 of the lens and includes the sphere axis 202A. Each rolling driving coil 303 has a generally V-shaped cross-section along a plane including the optical axis 10 of the lens and is located such that the trough portion of the V-shaped cross-section faces the optical axis 10.

As shown in FIG. 7, the position of the center of each panning driving magnet 401 and the position of the center of each panning driving coil 301 in the direction of the optical axis 10 approximately match the position of the sphere center 202A. Similarly, the position of the center of each tilting driving magnet 402 and the position of the center of each tilting driving coil 302 in the direction of the optical axis 10 approximately match the position of the sphere center 202A.

The panning driving section and the tilting driving section respectively include a pair of panning magnetic yokes 203 and a pair of tilting magnetic yokes 204, which are respectively located inner to the pair of panning driving coils 301 and the pair of tilting driving coils 302 and are both provided on the movable unit. The pair of panning driving coils 301 are respectively wound around the corresponding panning magnetic yokes 203. The pair of tilting driving coils 302 are respectively wound around the corresponding tilting magnetic yokes 204. As shown in FIG. 4, the pair of panning magnetic yokes 203 and the pair of tilting magnetic yokes 204 each overlap the corresponding rolling driving coil 303 also, and the panning magnetic yokes 203 and the tilting magnetic yokes 204 also act as rolling magnetic yokes.

In other words, as shown in FIG. 5, four coil units, each of which includes each of the pair of panning driving coils 301 or each of the pair of tilting driving coils 302 and also includes each of the four rolling driving coils 303, are located at an interval of 90 degrees on a circumference of the movable section 102 centered around the optical axis 10.

As shown in FIG. 6 and FIG. 7, the height position of the center of each panning driving coil 301, each tilting driving coil 302 and each rolling driving coil 303 in the direction of the optical axis 10 approximately matches the position of the sphere center 202A.

By electrifying the pair of panning driving coils 301, the pair of panning driving coils 301 receive a couple electromagnetic force from the pair of panning driving magnets 401, and thus the movable section 102, namely, the movable unit is driven to rotate in the panning direction 20 around the panning direction rotation axis 12.

Similarly, by electrifying the pair of tilting driving coils 302, the pair of tilting driving coils 302 receive a couple electromagnetic force from the pair of tilting driving magnets 402, and thus the movable unit is driven to rotate in the titling direction 21 around the tilting direction rotation axis 11.

By electrifying the panning driving coils 301 and the tilting driving coils 302 at the same time, the movable unit having the camera section 100 mounted thereon can be inclined two-dimensionally.

By electrifying the four rolling driving coils 303 located on a circumference of a circle centered around the optical axis 10, the four rolling driving coils 303 receive an electromagnetic force from the pair of panning driving magnets 401 and the pair of tilting driving magnets 402, and thus the movable unit having the camera section 100 mounted thereon is driven to rotate in the rolling direction 22 around the optical axis 10.

More specifically, as shown in FIG. 9, when the rolling driving coils 303 are electrified, a driving current flows in an upward direction 180 in the part of each rolling driving coil 303 facing the corresponding tilting driving magnet 402 and in a downward direction 181 in the part of each rolling driving coil 303 facing the corresponding panning driving magnet 401.

Accordingly, by magnetizing the tilting driving magnets 402 in the outward directions 182 and 186 away from the optical axis 10 and magnetizing the panning driving magnets 401 in the inward directions 183 and 185 toward the optical axis 10, an electromagnetic force 190 of the Fleming's left-hand rule is generated in the same direction around the optical axis 10 in each driving magnet and the part of each coil facing the corresponding driving magnet. Thus, the movable unit is rotated in the rolling direction 22.

As described above, this embodiment adopts a moving coil driving system in which the panning driving coils 301, the tilting driving coils 302 and the rolling driving coils 303 are provided for the movable unit. This structure generally has an advantage of capable of reducing the weight of the movable unit.

In this embodiment, no exclusive driving magnet for driving in the rolling direction 22 is provided, and the panning driving magnets 401 and the tilting driving magnets 402 also act as driving magnets for driving in the rolling direction 22. This can reduce the weight of the camera driving apparatus 165 and also decrease the number of components thereof.

In addition, a coil structure is provided in which the four rolling driving coils 303 are each bonded and thus fixed so as to bridge one side face of the corresponding panning driving coil 301 and one side face of the corresponding tilting driving coil 302. A magnet structure is provided in which each one of the panning driving magnets 401 and each one of the tilting driving magnets 402, which are adjacent to each other at an interval of 90 degrees in a circumferential direction of a circle centered around the optical axis 10, are magnetized oppositely to each other. Owing to these structures, the effective length of each of the four rolling driving coils 303 for generating an electromagnetic force can be increased. Thus, the driving efficiency in the rolling direction 22 can be improved.

Now, a function of returning the movable unit to a neutral position using the magnetic attracting force F will be described. As shown in FIG. 4, the pair of panning magnetic yokes 203 and the pair of tilting magnetic yokes 204 are respectively located to face the pair of panning driving magnets 401 and the tilting driving magnets 402. Therefore, when the rotating angle in the rolling direction 22 is 0 degrees, a magnetic gap between each panning driving magnet 401 and the corresponding panning magnetic yoke 203, and a magnetic gap between each tilting driving magnet 402 and the corresponding tilting magnetic yoke 204, are minimized. Therefore, when the rolling driving coils 303 are not electrified, the movable unit can be kept at the neutral position in the rolling direction 22, namely, a position at which the panning driving magnets 401 and the tilting driving magnets 402 are respectively closest to the panning magnetic yokes 203 and the tilting magnetic yokes 204, by a magnetic spring effect utilizing a fluctuation of the magnetic attracting force.

Now, the line 310', which is a wiring member for connecting the camera section 100 and a power supply or an image processing circuit provided on a fixed section to each other, will be described.

As shown in FIG. 1 and FIG. 7, the line 310' is spirally wound along a circumferential surface of the protrusion section 202. Preferably, the line 310' has a flat shape and flexibility. Preferably, the line 310' includes at least one flexible printed wiring plate 310. In this embodiment, the line 310' includes a pair of flexible printed wiring plates 310. The pair of flexible printed wiring plates 310 are wound in the same direction as being centered around the optical axis 10 obtained when the movable unit is at the neutral position. In other words, the pair of flexible printed wiring plates 310, as a whole, have a generally axial symmetrical structure centered around the optical axis 10. One end of each of the flexible printed wiring plates 310 is connected to a connector 325 provided on a relay board 320 attached to the movable section 102, and the other end thereof is connected to an external circuit (not shown) such as the power supply, the image processing circuit or the like provided on the fixed section.

In this embodiment, the driving coils are mounted on the movable section 102. Therefore, a signal line from the camera section 100 and lines of the driving coils are connected to the relay board 320, and are connected to the external circuit via the line 310'.

The line 310' is spirally wound along the circumferential surface of the protrusion section 202. Thus, the line 310' can be provided with a space-saving structure and can have much flexion with certainty. This provides a smooth rotating motion of the movable unit without preventing the motion of the movable unit of pivoting in the panning direction 20, the tilting direction 21 or the rolling direction 22.

In addition, the line 310' is drawn using a space between the movable section 102 and the protrusion section 202, which is required for allowing the movable unit to pivot as being centered around the sphere center 202A. Thus, it is not necessary to separately provide a space for allowing the line 310' to bend. Therefore, the camera driving apparatus 165 can be reduced in size.

The pair of flexible printed wiring plates 310 included in the line 310' have the axial symmetrical structure with respect to the optical axis 10. Therefore, in whichever direction the movable unit may be inclined as seen from the optical axis 10 in the neutral state as a result of rotating in the panning direction and the tilting direction, elastic forces generated in the pair of flexible printed wiring plates 310 act, with approximately an equal force, on the movable unit so as to return the movable unit to the neutral position. Thus, it is not necessary to cause an extra offset current to constantly flow in order to keep the movable unit at the neutral position. As a result, the power consumption can be reduced. In whichever direction the movable unit may be inclined from the neutral position, the elastic forces of the pair of flexible printed wiring plates 310 acting so as to return the movable unit to the neutral position are approximately equal to each other. Therefore, driving forces generated by the panning driving section and the rolling driving section in order to keep this inclining state are approximately equal to each other regardless of the inclining direction of the movable unit. This improves the controllability of the panning driving section and the rolling driving direction.

As described above, in this embodiment, the central axes of the camera section 100, the movable section 102, the protrusion section 202 and the attracting magnet 404 are all located to match the optical axis 10 passing the sphere center 202A, which is the supporting center and also the driving center. Therefore, the center of gravity of the movable unit matches the sphere center 202A, and the movable unit can be supported at the center of gravity. Moreover, the movable unit can be driven to rotate around the three axes which pass the center of gravity and are perpendicular to one another. In addition, the movable unit can be prevented from falling.

Since the line 310' is spirally drawn along the circumferential surface of the protrusion section 202, the line 310' can be provided with a space-saving structure and can have much flexion with certainty. This realizes a smooth rotating motion of the movable unit.

Now, detection of the inclination and the rotation of the movable unit will be described. The camera driving apparatus 165 includes a detector for detecting an inclining angle of the movable unit having the camera section 100 mounted thereon, and a rotating angle of the movable unit around the optical axis 10 of the lens, with respect to the fixed unit. Specifically, the camera driving apparatus 165 includes a first detection section for detecting a two-dimensional inclining angle of the movable unit, namely, a tilting angle in the panning direction 20 and the tilting direction 21, and a second detection section for detecting an rotating angle around the optical axis 10 of the lens.

First, detection, by the first detection section, of an inclining angle of the movable unit in the panning direction 20 and the tilting direction 21 of the movable unit will be described.

As shown in FIG. 1, FIG. 7 and FIG. 8, the first detection section includes the first magnetic sensor 501 for detecting an inclining angle of the movable unit. The first magnetic sensor 501 is capable of detecting inclination or rotation around two axes, and is located inside the protrusion section 202 so as to face the attracting magnet 404 magnetized to one pole in the direction of the optical axis 10.

Figure 10:
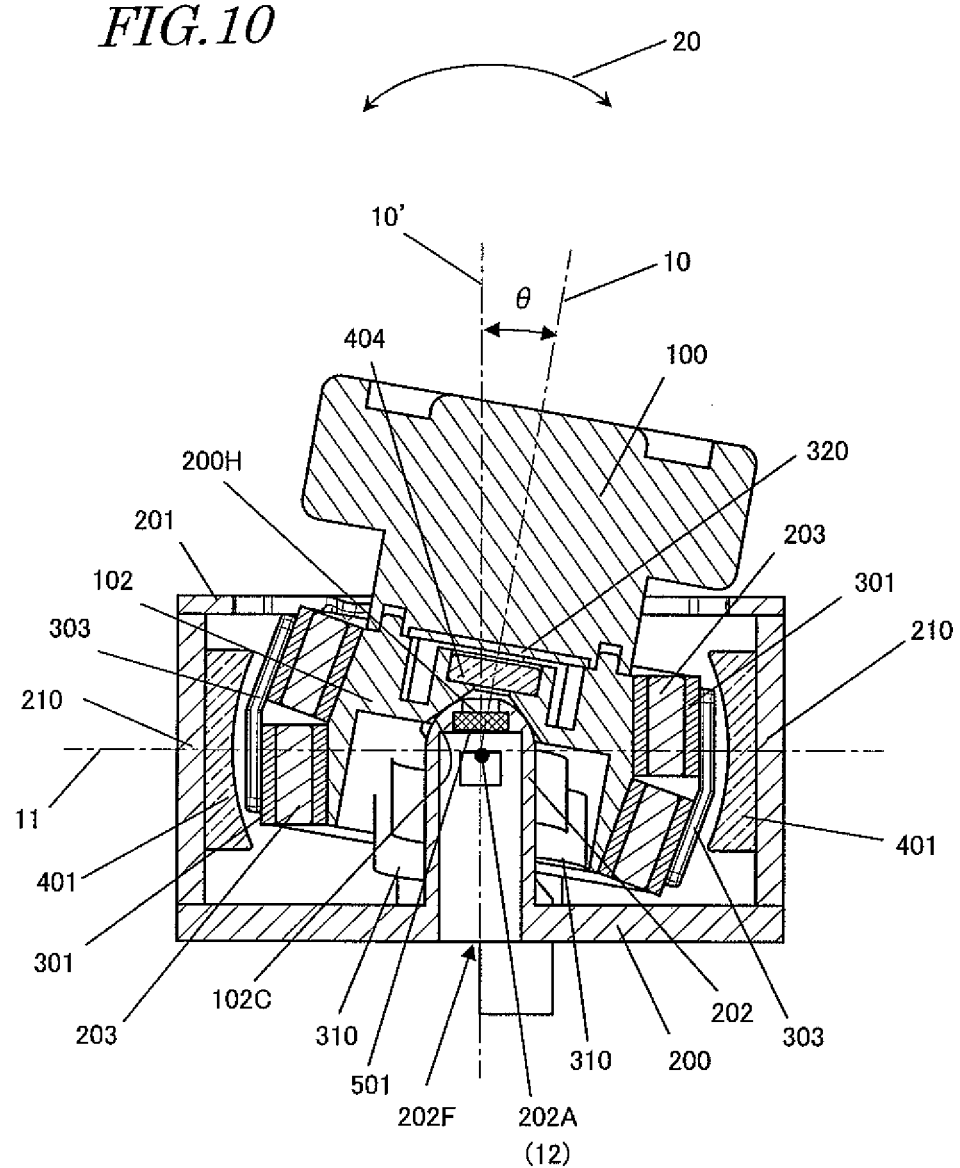
FIG. 10 is a cross-sectional view of the camera driving apparatus taken along a plane including the optical axis 10 and the tilting direction rotation axis 11 in the state where the camera section is inclined at an angle of θ in the panning direction.

FIG. 10 is a cross-sectional view of the camera driving apparatus taken along a plane including the optical axis 10 and the tilting direction rotation axis 11 in the state where the movable unit is inclined at an angle of θ in the panning direction from an optical axis 10' obtained when the movable unit is at the neutral position.

As shown in FIG. 10, inside the first magnetic sensor 501, a pair of hall elements (not shown) are located symmetrically with respect to the optical axis 10 on the tilting direction rotation axis 11, and another pair of hall elements (not shown) are located symmetrically with respect to the optical axis 10 on the panning direction rotation axis 12. The first magnetic sensor 501 can detect a change of the magnetic force of the attracting magnet 404 which is caused by the inclining motion of the movable unit at an angle of θ in the panning direction 20 as a biaxial component and thus can calculate a panning inclining angle and a tilting inclining angle. In the tip portion of the protrusion section 202, the tip opening 202H is provided so that a line of magnetic force of the attracting magnet 404 can directly enter the magnetic sensor 501.

As described above, in this embodiment, the attracting magnet 404 acts as a magnet for detecting an inclining angle in addition to having a function of providing the protrusion section 202 with the magnetic attracting force F. Therefore, the number of components of the apparatus can be decreased and the size of the apparatus can be reduced. In addition, there are advantages that the distance between the attracting magnet 404 and the sphere center 202A can be made shorter, and thus the first magnetic sensor 501 can be reduced in size.

Figure 11:
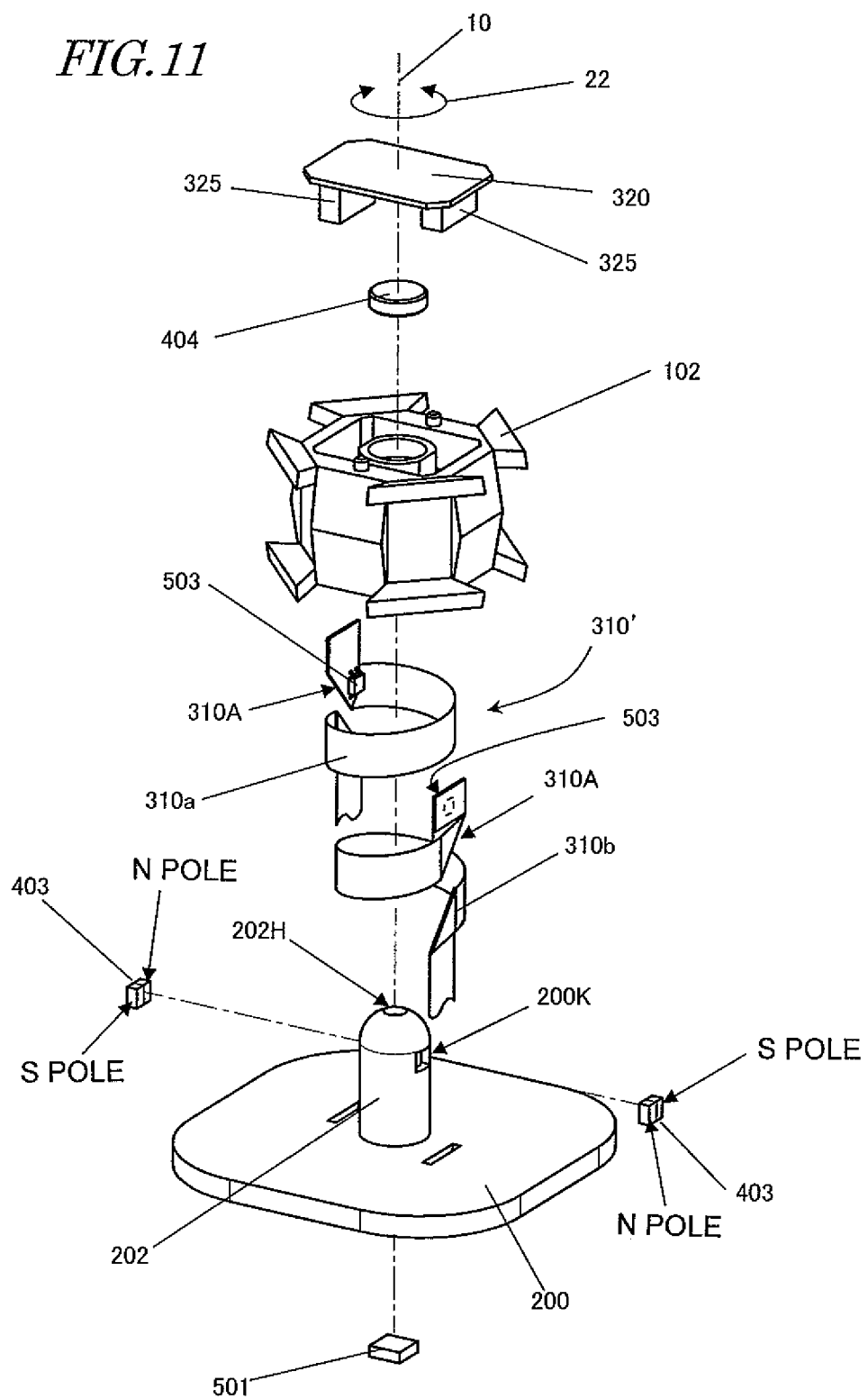
FIG. 11 is an exploded isometric view of a detection section for detecting rotation in a rolling direction in the camera driving apparatus in the embodiment.
Figure 12:
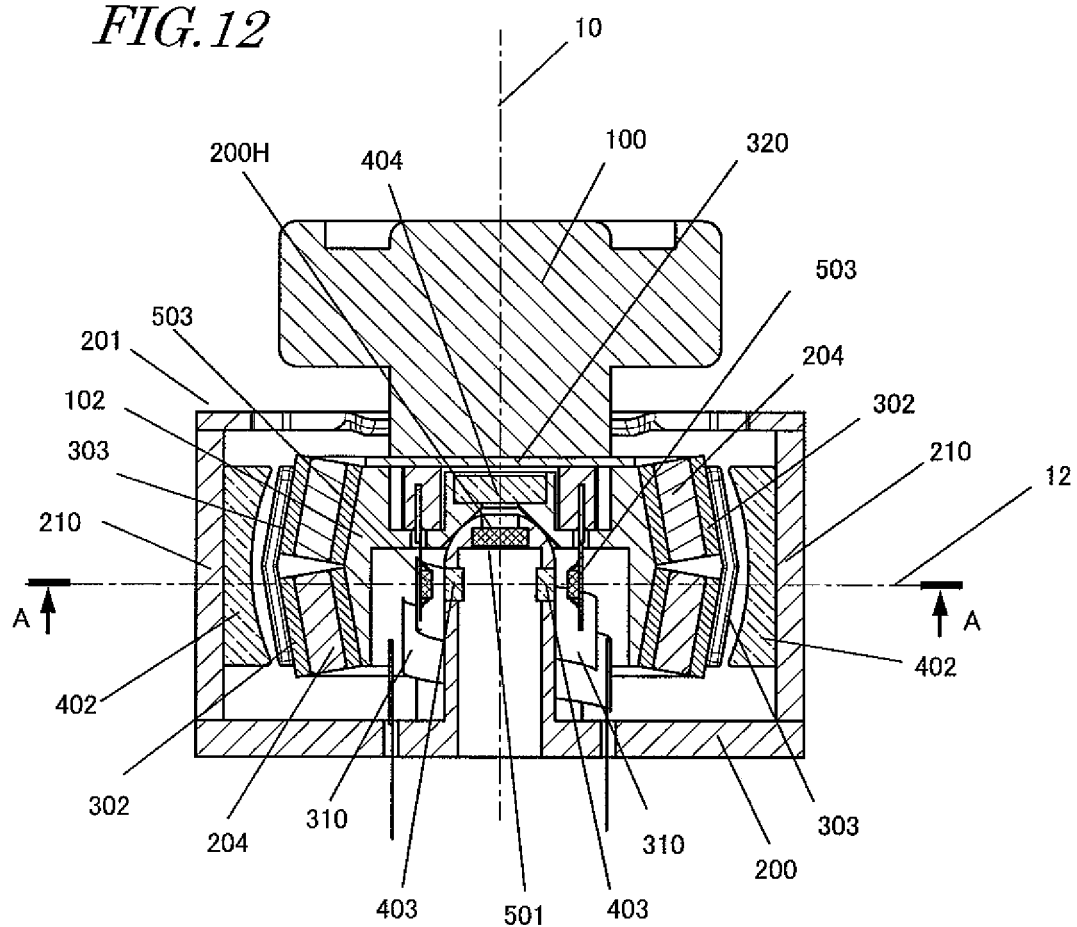
FIG. 12 is a cross-sectional view of the detection section for detecting rotation in the rolling direction in the camera driving apparatus in the embodiment taken along a plane including the optical axis 10 and the panning direction rotation axis 12.
Figure 13:
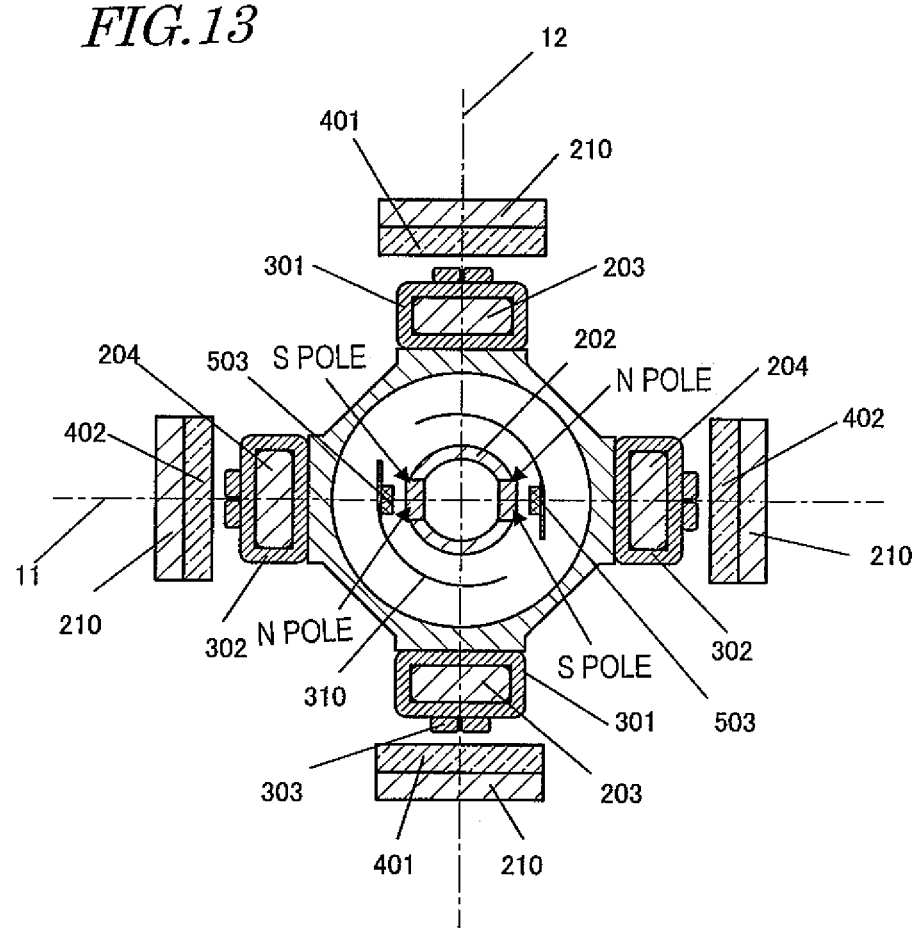
FIG. 13 is a cross-sectional view of the camera driving apparatus in the embodiment taken along line A-A in FIG. 12.

Now, detection, by the second detection section, of a rotating angle of the movable unit in the rolling direction will be described. As shown in FIG. 11, FIG. 12 and FIG. 13, the second detection section includes a pair of rotation detection magnets 403 inserted into openings 200K formed on a side surface of the protrusion section 202, and also a pair of second magnetic sensors 503 respectively attached to the pair of flexible printed wiring plates 310 so as to face the rotation detection magnets 403.

FIG. 11 is an exploded isometric view showing locations of the second magnetic sensors 503, which act as the second detection section for detecting the rotating angle of the movable unit in the rolling direction 22 around the optical axis 10. FIG. 12 is a cross-sectional view of the second detection section taken along a plane including the optical axis 10 and the panning direction rotation axis 12. FIG. 13 is a cross-sectional view taken along line A-A in FIG. 12.

As shown in FIG. 12, FIG. 13 and FIG. 14, the pair of second magnetic sensors 503 detect a change, caused by the rotation, of the magnetic force of the rotation detection magnets 403 and thus calculate the rotating angle of the movable unit. The pair of second magnetic sensors 503 are located symmetrically with respect to the sphere center 202A on a straight line which is on a plane perpendicular to the optical axis 10 and passes the sphere center 202A. The pair of rotation detection magnets 403 are located symmetrically with respect to the sphere center 202A on a straight line which is on a plane perpendicular to the optical axis 10 and passes the sphere center 202A.

As shown in FIG. 11 and FIG. 13, the pair of rotation detection magnets 403 are each divided and magnetized to two poles. Specifically, the pair of rotation detection magnets 403 each include two magnetic poles which are arranged in the circumferential direction of a circle centered around the optical axis 10 on a plane perpendicular to the optical axis 10 and are magnetized oppositely to each other. Because of this, the pair of rotation detection magnets 403 are magnetized in a direction passing the sphere center 202A and are located such that opposite poles face each other.

The pair of second magnetic sensors 503 can detect a change of the magnetic force of the rotation detection magnets 403 relatively moving with respect to each other by the rotating motion of the movable unit in the rolling direction 22, and thus can calculate the rotating angle in the rolling direction 22. The rotation detection magnets 403 are each divided and magnetized to two poles. Therefore, a drastic change of the magnetic force is obtained by the rotating motion of the movable unit in the rolling direction 22. By detecting this change, the rotating angle of the movable unit can be detected at a high sensitivity.

When the movable unit is inclined in the panning direction 20 and the tilting direction 21, a crosstalk output may be generated in the rolling direction 22. However, this crosstalk output can be canceled by detecting a change of the magnetic force of the pair of rotation detection magnets 403 by use of the pair of second magnetic sensors 503. Accordingly, only the rotating angle in the rolling direction 22 can be accurately extracted and detected in the range in which the movable unit can be inclined.

As shown in FIG. 11, the pair of second magnetic sensors 503 are respectively attached to the pair of flexible printed wiring plates 310 drawn in the space between the movable section 102 and the protrusion section 202. Therefore, it is possible to provide a driving coil unit on a circumference of a circle having a large radius centered around the optical axis 10 to improve the driving moment and also to provide the second magnetic sensors 503 acting as the second detection section on a circumference of a circle having a small radius centered around the optical axis 10. In this manner, the space can be effectively used.

In order to have the pair of second magnetic sensors 503, the pair of flexible printed wiring plates 310 are spirally drawn along the circumferential surface of the protrusion section 202 such that a radius of a part thereof connected to the camera section 100 is smaller a radius of a part thereof connected to the external circuit. This will be described specifically. The flexible printed wiring plates 310 each have a spiral shape such that the part thereof connected to the camera section 100 is located inside and the part thereof connected to the external circuit is located outside. For this reason, the flexible printed wiring plates 310 are liable to interfere with each other at the part connected to the camera section 100. In this embodiment, in order to suppress this interference, the flexible printed wiring plates 310 each have a rounded shape or a bent shape 310A in the vicinity of the part connected to the camera section 100. Owing to this shape of the pair of flexible printed wiring plates 310, the mutual interference is suppressed.

The pair of flexible printed wiring plates 310 respectively have the pair of second magnetic sensors 503 directly mounted thereon. Owing to this, lines connected to the second magnetic sensors 503 can be incorporated into the flexible printed wiring plates 310. As a result, it is not necessary to separately provide lines for the second magnetic sensors 503, which can reduce the number of components.

As described above, according to the camera driving apparatus in this embodiment, the line for connecting the camera main body and the external circuit provided on the fixed section to each other are spirally drawn along the circumferential surface of the protrusion section. Thus, the line can be provided with a space-saving structure and can have much flexion with certainty. This structure also can realize a smooth rotating motion of the movable unit without preventing the motion of the movable unit of pivoting in the panning direction, the tilting direction or the rolling direction. In addition, since the line is drawn using the space between the movable section and the protrusion section, the camera driving apparatus can be reduced in size.

The pair of flexible printed wiring plate forming the line have an axial symmetrical structure with respect to the optical axis. Therefore, in whichever direction the movable unit may be inclined as seen from the optical axis 10 in the neutral state as a result of rotating in the panning direction and the tilting direction, elastic forces generated in the pair of flexible printed wiring plates act, with approximately an equal force, on the movable unit so as to return the movable unit to the neutral position. Thus, driving forces generated by the panning driving section and the rolling driving section in order to keep this inclining state are approximately equal to each other regardless of the inclining direction of the movable unit. This improves the controllability of the panning driving section and the rolling driving direction. In addition, it is not necessary to cause an extra offset current to constantly flow in order to keep the movable unit at the neutral position, and thus the power consumption can be reduced.

The pair of rotation detection magnets magnetized oppositely to each other, on a plane perpendicular to the optical axis, in a circumferential direction of a circle centered around the position of the optical axis are provided on the fixed unit, and the pair of second magnetic sensors provided on the pair of flexible printed wiring plates drawn from the movable unit detect a change of the magnetic force of the rotation detection magnets moving with respect to each other. Using the detected change, the crosstalk output which is generated when the movable unit is pivoted in the panning direction and the tilting direction can be cancelled. Therefore, only the angle in the rolling direction can be extracted and detected in the range in which the movable unit can be pivotable.

The second magnetic sensors are located on the flexible printed wiring plates. Owing to this, it is possible to provide a driving section on a circumference of a circle having a large radius centered around the optical axis to improve the driving moment and also to locate the second magnetic sensors for detecting the angle in the rolling direction on a circumference of a circle having a small radius centered around the optical axis. Thus, the space can be effectively used, and the apparatus can be space-saving.

The second magnetic sensors are directly mounted on the flexible printed wiring plates. Owing to this, the lines for the sensors can be reduced, and thus the number of components can be decreased.

In this embodiment, the camera driving apparatus includes the pair of flexible printed wiring plates as the line. The present invention is not limited to this. Three flexible printed wiring plates may be located at an interval of 120 degrees as being centered around the optical axis, so as to keep the movable section at the neutral position by use of the elasticity of the flexible printed wiring plates. Alternatively, four flexible printed wiring plates may be located at an interval of 90 degrees as being centered around the optical axis. In these cases, the second magnetic sensors may be mounted respectively on any two flexible printed wiring plates, so that the rotation detection can be performed in substantially the same manner as described above.

Even in the case where five or more flexible printed wiring plates are provided, these flexible printed wiring plates may be drawn at an equal interval as being centered around the optical axis in substantially the same manner, and the second magnetic sensors may be mounted on any two flexible printed wiring plates (at symmetrical positions when the flexible printed wiring plates are provided in an even number). In this case also, substantially the same effect as described above can be provided.

Accordingly, the camera driving apparatus in this embodiment allows the movable unit to, for example, incline at a large angle of (10 degrees or greater in the panning direction and the tilting direction, and also to rotate at a large angle of (10 degrees or greater in the rolling direction. In addition, good shake compensation control is realized in a wide frequency band of up to about 50 Hz.

As a result, the camera driving apparatus realizes high-speed panning, tilting and rolling motions of the camera section and also can compensate for image blurring of a photo caused by camera-shake occurring while the photographer is walking. Moreover, the camera driving apparatus has a compact and solid fall preventive structure and so is highly resistant against an external impact such as vibration, falling or the like.

INDUSTRIAL APPLICABILITY

A camera driving apparatus according to the present invention, owing to a structure capable of performing driving in a panning direction, a tilting direction and a rolling direction, is suitable for wearable cameras or the like, which can compensate for three-axis shake including rolling shake caused by a transfer of the walking balance when the photographer takes a photo while walking. The camera driving apparatus according to the present invention is also suitable for cameras chasing a subject at a high speed, surveillance cameras, onboard cameras and the like which need to make high-speed tilting, panning and rolling motions.

The present invention also provides a video camera which is capable of performing super-wide-angle photography of still images and also moving images because a high-speed tilting or panning motion realizes high-speed synthesis of images which have been taken.

REFERENCE SIGNS LIST

10 Optical axis
11 Tilting direction rotation axis
12 panning direction rotation axis
20 Panning direction
21 Tilting direction
22 Rolling direction
50 Gap
100 Camera section
102 Movable section
102D, 102F, 102G Contact face
102C Contact face
165 Camera driving apparatus
170 Camera unit
200 Base
200K Opening
201 Fall preventive member
201A Fall preventive regulation section
202 Protrusion section
202A Sphere center
202F Opening
203, 204 Magnetic yoke
210 Coupling member
301, 302, 303 Driving coil
310 Flexible printed wiring plate
310' Line
320 Relay board
401, 402 Driving magnet
403 Rotation detection magnet
404 Attracting magnet
501 First magnetic sensor
503 Second magnetic sensor

The invention claimed is:

1. A camera driving apparatus, comprising:
a camera section including an imaging element having an imaging plane, a lens which has an optical axis and forms an image of a subject on the imaging plane, and a lens barrel for holding the lens;
a fixed unit including a protrusion section which is formed of a magnetic member at least partially and has a shape of a part of a spherical face;
a movable unit for supporting the camera section, the movable unit including an attracting magnet for generating a magnetic attracting force for the magnetic member, and a conical contact face with which the protrusion section is loosely engageable and contactable by the magnetic attracting force, the movable unit being freely pivotable with respect to a sphere center of the spherical face of the protrusion section;
a panning driving section for inclining the camera section with respect to the fixed unit in a panning direction;
a tilting driving section for inclining the camera section with respect to the fixed unit in a tilting direction which is perpendicular to the panning direction;
a rolling driving section for rotating the camera section with respect to the fixed unit in a rolling direction centered around the optical axis of the lens;
a detector for detecting an inclining angle of the camera section with respect to the fixed unit in the panning and tilting directions and a rotating angle of the camera section in the rolling direction; and
a line for electrically connecting the camera section and an external circuit to each other, the line being spirally wound around the protrusion section.

2. The camera driving apparatus of claim 1, wherein the line includes at least two flexible printed wiring plates, and the at least two flexible printed wiring plates have an axial symmetrical structure with respect to the optical axis obtained when the movable unit is at a neutral position.

3. The camera driving apparatus of claim 2, wherein the detector includes:
a first detection section for detecting an inclining angle of the camera section with respect to the fixed unit in the panning and tilting directions; and
a second detection section for detecting a rotating angle of the camera section in the rolling direction.

4. The camera driving apparatus of claim 3, wherein:
the first detection section includes a first magnetic sensor fixed to the fixed unit; and
the first magnetic sensor detects a change of a magnetic force caused by inclination of the attracting magnet provided in the movable unit to calculate a two-dimensional inclining angle of the camera section in the panning and tilting directions.

5. The camera driving apparatus of claim 4, wherein:
the second detection section includes:
a pair of rotation detection magnets fixed to the fixed unit; and
a pair of second magnetic sensors respectively attached to the at least two flexible printed wiring plates; and
the pair of second magnetic sensors detect a change of a magnetic force caused by a mutual rotating motion of the rotation detection magnets to calculate a rotating angle of the camera section.

6. The camera driving apparatus of claim 5, wherein the pair of second magnetic sensors are located symmetrically with respect to the sphere center on a straight line which is on a plane perpendicular to the optical axis of the lens and passes the sphere center, and the pair of rotation detection magnets are located symmetrically with respect to the sphere center on a straight line which is on a plane perpendicular to the optical axis of the lens and passes the sphere center.

7. The camera driving apparatus of claim 5, wherein the pair of rotation detection magnets each include two magnetic poles, magnetized oppositely to each other, on a straight line which is on a plane perpendicular to the optical axis of the lens and passes the sphere center, and the two magnetic poles are arranged on a circumference of a circle centered around the optical axis.

8. The camera driving apparatus of claim 2, wherein the flexible printed wiring plates has a rounded shape or a bent shape in the vicinity of an end thereof connected to the camera section.

9. The camera driving apparatus of claim 1, further comprising a fall preventive member including a fall preventive regulation section distanced from the movable unit by a prescribed gap in a direction of the optical axis, the fall preventive member being fixed to the fixed unit.

* * * * *